(12) United States Patent
Takei

(10) Patent No.: US 7,917,093 B2
(45) Date of Patent: Mar. 29, 2011

(54) WIRELESS MONITORING SYSTEM AND CHILD STATION THEREFOR

(75) Inventor: Ken Takei, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 1034 days.

(21) Appl. No.: 11/730,060

(22) Filed: Mar. 29, 2007

(65) Prior Publication Data

US 2007/0298716 A1   Dec. 27, 2007

(30) Foreign Application Priority Data

Mar. 31, 2006   (JP) ................................. 2006-097579

(51) Int. Cl.
  *H04B 17/00*   (2006.01)
(52) U.S. Cl. ........................................ 455/67.11; 455/42
(58) Field of Classification Search .................... None
  See application file for complete search history.

(56) References Cited

U.S. PATENT DOCUMENTS

| | | | |
|---|---|---|---|
| 5,940,447 A * | 8/1999 | Connell et al. ................ | 375/316 |
| 2002/0090958 A1 * | 7/2002 | Ovard et al. .................. | 455/456 |
| 2003/0224801 A1 * | 12/2003 | Lovberg et al. ............... | 455/454 |
| 2004/0142733 A1 * | 7/2004 | Parise ........................... | 455/572 |
| 2007/0004363 A1 * | 1/2007 | Kusaka et al. ................ | 455/269 |
| 2008/0186129 A1 * | 8/2008 | Fitzgibbon ..................... | 340/5.2 |

FOREIGN PATENT DOCUMENTS

| JP | 6-347544 | 12/1994 |
|---|---|---|
| JP | 3609928 | 10/2004 |

OTHER PUBLICATIONS

Sungjoon Lim, et al., "Microwave Theory and Techniques, IEEE Transactions; Adaptive Power Controllable Retrodirective Array System for Wireless Sensor Server Applications, vol. 53, Issue. 12; Dec. 2005, p. 3735-3743".
K.V. Seshagiri Rao, et al. "IEEE Transactions on Antennas and Propagation; Antenna Design for UHF RFID Tags: A Review and a Practical Application, vol. 53, No. 12, Dec. 2005, p. 3870-3876".

* cited by examiner

*Primary Examiner* — Zhiyu Lu
(74) *Attorney, Agent, or Firm* — McGinn IP Law Group, PLLC

(57) ABSTRACT

A wireless monitoring system using a base station and a child station, includes the base station including a base-station transmitting and a base-station receiving antenna, and the child station including a child-station receiving antenna, a nonlinear, a smoothing circuit, a first high-frequency band-pass filter, an intermediate-frequency band-pass filter, a demodulator, a baseband, a modulator, and a child-station transmitting antenna. The base-station transmitting antenna and the child-station receiving antenna include circularly-polarized antennas which have a same rotating direction, and the child-station transmitting antenna and the base-station receiving antenna include circularly-polarized antennas which have a polarization characteristic rotating in a direction opposite to the base-station transmitting antenna and the child-station receiving antenna.

21 Claims, 13 Drawing Sheets

24a,24b BRANCH CIRCUIT
41a,41b,41c,41d MODIFIED DIODE BRIDGE CIRCUIT
83 WILKINSON COUPLING CIRCUIT
91 TRANSMISSION LINE

WIRELESS MONITORING SYSTEM AND CHILD STATION THEREFOR

The present application is based on Japanese Patent Application No. 2006-097579 filed on Mar. 31, 2006, the entire contents of which are incorporated herein by reference.

BACKGROUND OF THE INVENTION

1. Field of the Invention

This invention relates to a wireless monitoring system which is allowed to monitor or investigate a condition of a place inappropriate for a living thing (e.g., human) to access easily and safely, such as an altitude area, a high-concentration hazardous chemical substance filling area, a radiation management area, a high electric power passing area, a high temperature area, a high pressure area, an area which must be kept a high-level hygiene environment.

Especially, this invention relates to a wireless monitoring system and a child station in which replacing a battery of an apparatus (e.g., a child station) which enables such monitoring or investigation is not required, and can be assured a reliability of the apparatus after the apparatus is located.

2. Description of the Related Art

A social infrastructure system such as an electric power supply, a water supply, a communication, etc., is getting more sophisticated and complex according to a requirement for heightened convenience by a user. Once the system does not operate normally, not only are many direct users caused inconvenience and damage, but also users using other systems, which are related complexly to each other and may be affected by the damage, also may be caused some kind of damage and inconvenience. Further, there is a possibility that a confusion of whole area or whole society is caused. Such a wide area blackout or a wide area toxic chemical substance pollution, which is reported frequently, has already been developed as a big social problem.

One method for solving the above problem is to investigate a condition of an apparatus which is pivotal (critical) in the social infrastructure system and a condition of an environment surrounding the apparatus.

When the social infrastructure system becomes non-operational, if it is possible to investigate which apparatus does not run normally, then the social infrastructure system can be recovered early, and a bad influence on other social infrastructure systems is minimized.

Additionally, if it is possible to investigate or monitor periodically the operating condition of each apparatus in the social infrastructure system and the condition surrounding the apparatus, the social infrastructure system can be prevented from being non-operational.

Nowadays, since users want an advanced service, the apparatus which is pivotal (critical) in the social infrastructure system is concentrated in an area where is isolated and far from a usual residential area of the users, and the apparatus around the usual residential area is operated in an extreme environment having a dangerousness or a problem.

With regard to the electric power supply, there are a nuclear power station having a risk of a radiation exposure, a thermal power station having a risk of a flash fire explosion, a hydro-electric power station including many drops which have a long distance in elevation, and a transmission and transformation substation which transmits and distributes a high voltage electric power generated in an electric power station. With regard to the water supply, in light of safety and health, for preventing a reservoir and a water treatment plant from pollution by a living thing (e.g., human), easy access to these facilities is not allowed. With regard to communication, a base-station antenna is established at an altitude for providing a wireless communication, and a transmission media (e.g., optical fiber) is established on the ground or underground for providing an optical communication. Thus, in these cases, it is not easy to access these facilities.

In view of the above, focusing on a permeability, a diffraction propagation characteristic, and a non-contact characteristic of an electromagnetic wave, an attempt to add any detecting mechanism to the facilities and detect a condition of the facilities as a wireless signal by using a electric wave has been done.

However, a damping characteristic of the electromagnetic wave with regard to distance, according to a propagation characteristic of the electromagnetic wave-like spherical wave, is much larger than that of a cable communication in which an energy of a transmitting signal is confined in a cable and transmitted. For this reason, there is a problem of how to provide an electric power for radiating the electromagnetic wave to an extra space to transmit an information wirelessly to the apparatus constituting the social infrastructure system.

Although the apparatus uses the electric power in itself, applying a part of the electric power used by the apparatus to investigate an environment surrounding the apparatus causes a primary movement of the apparatus to give a disturbance and is avoided preferably.

Although a battery can be used, applying a primary battery is not preferred since a replacement of the primary battery is needed and may cause a new danger from the environment surrounding the apparatus. Moreover, although a secondary battery could be used, an assurance for a chemical characteristic of the secondary battery is not solved. Thus, considering a lifetime of an acceptable social infrastructure system, the secondary battery is not semi-permanent, so that the secondary battery cannot be a definitive solution.

As a solution without the battery, a method of providing the electric power used by the apparatus wirelessly could be employed. With this method, the problem of safety with regard to the battery replacement and a problem of a reliability may be solved, since a lifetime of a current electric element or electronic element is sufficiently long compared to the lifetime of the social infrastructure system.

However, since the electric power of the electromagnetic wave is reduced greatly during a space propagation as discussed previously, achieving an efficient signal transmission and an energy transmission by using the electromagnetic wave is a big technical problem.

As conventional technology to achieve transmission of the electric power and the signal by using the electromagnetic wave, some methods in which a wireless apparatus includes an antenna for transmitting an electric power wirelessly and an antenna for transmitting a signal are proposed. For example, in a system in which an apparatus located in a forest records a flight history of an airplane, a technology superposing the record on the electromagnetic wave and transmitting the record to exterior wirelessly is disclosed in "Microwave Theory and Techniques, IEEE Transactions; Vol. 53, Issue.12; p. 3735-3743" (non-patent document 1).

Further, as another conventional technology to achieve a transmission of the electric power and the signal by using the electromagnetic wave, some methods commonly called a "high-frequency wireless tag system" are proposed. For example, a system identifying a baggage by using the high-frequency wireless tag system is disclosed in "IEEE TRANSACTIONS ON ANTENNAS AND PROPAGATION; Vol. 53, No. 12; p. 3870-3876" (non-patent document 2).

However, in the technology disclosed in the non-patent document 1, there are some problems that (1) a location of the apparatus cannot be identified, since the apparatus is located in a forest, (2) since the apparatus executes a complex transaction for varying a direction of the electromagnetic wave radiated by the apparatus dynamically, the apparatus includes three antennas which are an antenna for transmitting a signal, an antenna for receiving a signal, and an antenna for obtaining the electric power, and a size of the apparatus becomes large, and (3) the apparatus needs extra electric energy in addition to the electric energy provided by the electromagnetic wave, because of the complex processing.

On the other hand, in the technology disclosed in the non-patent document 2, an antenna for transmitting and receiving a signal and an antenna for obtaining an electric power are provided as the same antenna, and the apparatus is downsized. However, since only a few meters are considered as a maximum distance between a base station and a child station (i.e., a mobile station) in this system, there is a problem that a distance for isolating the apparatus cannot be ensured sufficiently, when the child station is located at a place where there is not a good influence for a user.

Further, since the antenna for transmitting and receiving a signal and the antenna for obtaining an electric power is provided in one antenna in this system, and since communicating and obtaining an electric energy are operated with time division multiplex individually, a long time is needed for obtaining the electric energy to increase an energy of electromagnetic wave for extending a reachable distance of the electromagnetic wave radiated by the apparatus. An entire communication is not available during the obtaining the electric energy. For this reason, there is a problem that it is difficult for the base station to distinguish whether the child station is not available to communicate, or is obtaining the electric energy in a normal condition. Even though a complete signal transmission cannot be achieved, if at least an information cannot be provided regarding whether a communication link between the base station and the child station is established, it is difficult to ensure the reliability required by the current social infrastructure system.

Thus, prior to the present invention, there has been no conventional system or method which can provide a wireless monitoring system and a child station used therein which can monitor or investigate with high reliability a condition which is an operating condition of each apparatus located in a difficult-to-access environment and located in a social infrastructure system, or a condition of the environment where the apparatus is located, while the apparatus does not include a battery as a power source therein and is kept at a distance to isolate a user (human) from an influence of an environment (e.g., place) where the apparatus (e.g., child station) is located.

SUMMARY OF THE INVENTION

In view of the foregoing and other exemplary problems, drawbacks, and disadvantages of the conventional methods and structures, an exemplary feature of the present invention is to provide a wireless monitoring system and a child station used therein which is allowed to monitor or investigate a condition of where it is typically not appropriate for a living thing (e.g., human) to access physically due to safety or health issues.

According to one exemplary aspect of the invention, a wireless monitoring system using a base station and a child station, includes:

the base station including:

a base-station transmitting antenna for transmitting an electric power supplying carrier and a signal transmitting carrier to the child station; and a base-station receiving antenna for receiving an output from the child station;

the child station including:

a child-station receiving antenna which includes a balanced antenna;

a nonlinear circuit that receives an output from the child-station receiving antenna;

a smoothing circuit that receives an output from the nonlinear circuit;

a first high-frequency band-pass filter, a pass band of the first high-frequency band-pass filter including a frequency of the electric power supplying carrier;

an intermediate-frequency band-pass filter, a pass band of the intermediate-frequency band-pass filter including an intermediate frequency which includes a differential frequency between the electric power supplying carrier and the signal transmitting carrier;

a demodulator that receives an output from the intermediate-frequency band-pass filter and uses an output from the smoothing circuit as a power source, a baseband circuit that modifies a baseband signal using an output from the demodulator;

a modulator for modulating a high frequency signal outputted from the first high-frequency band-pass filter by using the baseband signal; and a child-station transmitting antenna for radiating an output from the modulator, wherein the base-station transmitting antenna and the child-station receiving antenna include circularly-polarized antennas which have a same rotating direction, and the child-station transmitting antenna and the base-station receiving antenna include circularly-polarized antennas which have a polarization characteristic rotating in a direction opposite to the base-station transmitting antenna and the child-station receiving antenna.

In the above exemplary invention, many exemplary modifications and changes can be made as below.

(1) The child-station receiving antenna is a balanced antenna, and the nonlinear circuit includes a balanced-unbalanced transforming circuit for distributing a balanced input received by the child-station receiving antenna into two unbalanced outputs;

two nonlinear elements receiving each of the two unbalanced outputs;

first and second branch circuits for distributing each signal from the nonlinear elements;

a first coupling circuit for coupling an output from each of the first and second branch circuits, an output of the first coupling circuit being inputted to the first high-frequency band-pass filter; and a second coupling circuit for coupling the other output from each of the first and second branch circuit, an output of the second coupling circuit being inputted to the smoothing circuit and the intermediate-frequency band-pass filter.

(2) An output of the second coupling circuit is outputted through an electric power supplying carrier blocking filter.

(3) Diodes are disposed instead of the balanced-unbalanced transforming circuit and the nonlinear element;

the diodes are disposed between each terminal of the child-station receiving antenna and a ground potential, in which a cathode of the diodes are connected to the ground potential; and the diodes are disposed between each terminal of the child-station receiving antenna and the first and second branch circuits, in which anodes of the diodes are connected to each of the first and second branch circuits.

(4) The first coupling circuit includes an anti-phase coupling circuit.

(5) the anti-phase coupling circuit is a rat-race coupling circuit.

(6) The second coupling circuit includes a co-phase coupling circuit.

(7) The co-phase coupling circuit includes a Wilkinson coupling circuit.

(8) A transmission line, having an electric length corresponding to a quarter wavelength of a frequency of the electric power supplying carrier, being inserted instead of the electric power supplying carrier blocking filter; and a second high-frequency band-pass filter being inserted between one end of the transmission line and ground potential, a pass band of the second high-frequency band-pass filter being a frequency of the electric power supplying carrier.

(9) An electric power of the electric power supplying carrier is larger than that of the signal transmitting carrier.

(10) A frequency of the electric power supplying carrier is smaller than that of the signal transmitting carrier.

(11) The child-station transmitting antenna includes an unbalanced antenna.

(12) A method of the modulator includes a frequency modulation.

(13) The signal transmitting carrier is modulated by frequency.

(14) A characteristic impedance of the child-station receiving antenna is larger than twice of a characteristic impedance of the smoothing circuit.

(15) A sensor circuit connected to the baseband circuit, the sensor circuit responding to any of a temperature, a pressure, a concentration of a chemical substance, an electricity, a sound, an electromagnetic wave, a humidity, and a radioactivity; and a baseband signal transmitted from the baseband circuit being modified by using an output signal of the sensor circuit.

(16) A memory connected to the baseband circuit, the memory having a specific identification information of the child station, and wherein the specific identification is stored to the baseband signal by being superposed on a modulation signal of the signal transmitting carrier, and an identification is added to the baseband signal transmitted from the baseband circuit only when the specific identification inputted to the baseband circuit and the specific identification stored in the memory correspond.

(17) An addition of the information to the baseband signal transmitted from the baseband circuit is modified by using an output signal of the sensor circuit.

(18) The child-station transmitting antenna and the child-station receiving antenna include planar antennas.

(19) The child station includes a multilayer substrate; and the child-station transmitting antenna and the child-station receiving antenna are formed on one layer of the multilayer substrate, moreover, the other circuit components are formed on the other layer.

According to another exemplary aspect of the invention, a child station used in a wireless monitoring system using an electric power supplying carrier and a signal transmitting carrier, including:

a child-station receiving antenna which includes a balanced antenna;

a nonlinear circuit which receives an output from the child-station receiving antenna;

a smoothing circuit which receives an output from the nonlinear circuit;

a first high-frequency band-pass filter, a pass band of the first high-frequency band-pass filter including a frequency of the electric power supplying carrier;

an intermediate-frequency band-pass filter, a pass band of the intermediate-frequency band-pass filter including an intermediate frequency which includes a differential frequency between the electric power supplying carrier and the signal transmitting carrier;

a demodulator which receives an output from the intermediate-frequency band-pass filter and uses an output from the smoothing circuit as a power source;

a baseband circuit which modifies a baseband signal based on an output from the demodulator;

a modulator for modulating a high frequency signal outputted from the first high-frequency band-pass filter by using the baseband signal; and a child-station transmitting antenna for radiating an output from the modulator, wherein the child-station receiving antenna, the child-station transmitting antenna, and the base-station receiving antenna are circularly-polarized antennas which have a polarization characteristic rotating in an opposite direction from each other.

According to another exemplary aspect of the invention, a child station used in a wireless monitoring system using an electric power supplying carrier and a signal transmitting carrier, including:

a base-station transmitting antenna and a base-station receiving antenna; and a child-station transmitting antenna and a child-station receiving antenna, wherein the base-station transmitting antenna and the child-station receiving antenna include circularly-polarized antennas which have a same rotating direction, and the child-station transmitting antenna and the base-station receiving antenna include circularly-polarized antennas which have a polarization characteristic rotating in a direction opposite to the base-station transmitting antenna and the child-station receiving antenna.

The above exemplary modifications may be made alone or in any combination thereof.

With the unique and unobvious structure of the present invention, a wireless monitoring system and a child station used therein is provided which can monitor or investigate with high reliability a condition which is an operating condition of each apparatus located in an environment, difficult to be accessed by a human and located in a social infrastructure system, or a condition of the environment where the apparatus is located, such that the apparatus does not include a battery as a power source therein and is kept at a distance to isolate the user from an influence of an environment (e.g., place) where the apparatus (e.g., child station) is located.

BRIEF DESCRIPTION OF THE DRAWINGS

The foregoing and other exemplary purposes, aspects and advantages will be better understood from the following detailed description of an exemplary embodiment of the invention with reference to the drawings, in which.

DETAILED DESCRIPTION OF THE EXEMPLARY EMBODIMENTS

Figure 1:
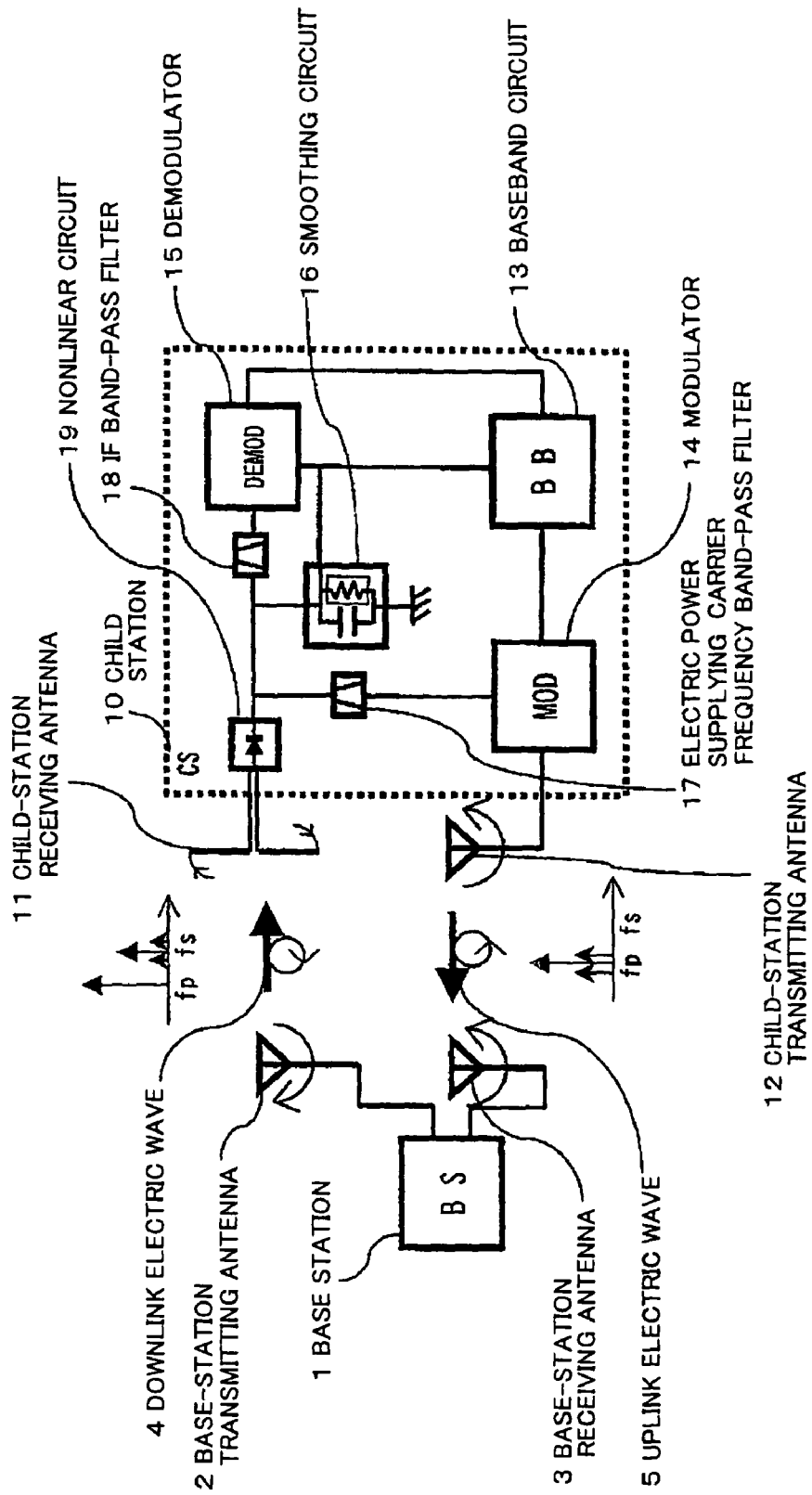
FIG. 1 is a schematic diagram showing a constitution of a wireless monitoring system in a first exemplary embodiment according to the present invention.

Referring now to the drawings, and more particularly to FIGS. 1-13, there are shown exemplary embodiments of the methods and structures according to the present invention.

Exemplary Embodiment 1

A Constitution of a Wireless Monitoring System

FIG. 1 is a schematic diagram showing a constitution of a wireless monitoring system in a first exemplary embodiment according to the present invention. In the wireless monitoring system of a first exemplary embodiment, an electric power transmission and a communication are performed between a base station (BS) 1 and a child station (CS) 10.

(A Constitution of the Base Station)

The base station 1 includes a base-station transmitting antenna 2 which is a circularly-polarized antenna and a base-station receiving antenna 3 which is a circularly-polarized antenna having a polarization characteristic rotating in a direction opposite to the base-station transmitting antenna 2.

(A Movement of the Base Station)

In a downlink electric wave 4 from the base station 1 to the child station 10, an electric power supplying non-modulated carrier (circularly-polarized wave) and a signal transmitting modulated carrier (circularly-polarized wave), which are in the same frequency band, are transmitted to the child station 10 at the same time.

Exemplarily, the signal transmitting modulated carrier is modulated by frequency. Although there are an amplitude modulation, a phase modulation, and a frequency modulation as a modulation method used in a wireless communication, frequency modulation and phase modulation make a frequency band of the modulation signal increase after modulation. Since an increase of the frequency band brings an improvement of a signal transmitting quality, in view of transmitting in the same signal transmitting quality, a signal can be transmitted farther. Thus, by selecting the frequency modulation, a distance available to communicate between the base station 1 and child station 10 can be increased.

(A Constitution of a Child Station)

The child station 10 includes a child-station receiving antenna 11 which is a balanced circularly-polarized antenna, a child-station transmitting antenna 12 which is a circularly-polarized antenna having a polarization characteristic rotating in a direction opposite to the child-station receiving antenna 11, a baseband circuit (BB) 13, a modulator (MOD) 14, a demodulator (DEMOD) 15, a smoothing circuit 16, an electric power supplying carrier frequency band-pass filter 17 (high-frequency band-pass filter), an intermediate-frequency (IF) band-pass filter 18, and a nonlinear circuit 19.

Exemplarily, the child-station transmitting antenna 12 is an unbalanced antenna. Thereby, a balanced-unbalanced transforming circuit (balun) is unnecessary, and a downsizing of the apparatus and a low-loss can be achieved.

Further, for the above reason, a modulation method of the modulator 15 is exemplarily selected as the frequency modulation.

Additionally, a characteristic impedance of the child-station receiving antenna 11 is exemplarily larger than twice of a characteristic impedance of the smoothing circuit 16. When the characteristic impedance of the smoothing circuit 16 is smaller than that of the child-station receiving antenna 11, an energy of a high-frequency signal from the child-station receiving antenna 11 to the smoothing circuit 16 is transmitted more easily, and more electric power can be provided to the smoothing circuit 16.

(A Movement of the Child Station)

In an uplink electric wave 5 from the child station 10 to the base station 1, the signal transmitting modulated carrier (circularly-polarized wave), which has the same frequency and the opposite rotating characteristic to the electric power supplying non-modulated carrier (circularly-polarized wave) of the downlink electric wave 4, is transmitted.

A receiving electric power of the child-station receiving antenna 11 is inputted to the nonlinear circuit 19, an output of the nonlinear circuit 19 is inputted to the smoothing circuit 16, the electric power supplying carrier frequency band-pass filter 17, and the intermediate-frequency band-pass filter 18. A direct current output of the smoothing circuit 16 is provided to the baseband circuit 13 and the demodulator 15 as a power source. An output of the intermediate-frequency band-pass filter 18 is inputted to the demodulator 15, transformed to a baseband signal therein, and then inputted to the baseband circuit 13. After a signal processing in the baseband circuit 13, the baseband signal is inputted to the modulator 14. In the modulator 14, an electric power supplying carrier which is an output from the electric power supplying carrier frequency band-pass filter 17 is modulated. An output of the modulator 14 is radiated as an electric wave toward the base station 1 by the child-station transmitting antenna 12.

(A Frequency of the Electromagnetic Wave)

In this exemplary embodiment, the frequency of the electromagnetic wave which assures a transmission of the signal and the electric power between the base station 1 and the child station 10 is in a range of hundreds of MHz to tens of GHz, the electromagnetic wave of this frequency band is modulated by a signal in which a frequency thereof is tens of MHz and below, a signal in which a frequency thereof is tens of MHz and below is extracted by the frequency modulation, and then a modulation or a demodulation is done. Thereby, an efficient wireless system can be provided as discussed below.

When the electromagnetic wave is radiated by use of the electric power provided externally by the electromagnetic wave, in order to maximize the electric power of this radiated electromagnetic power, how to transform efficiently the electric power provided externally by the electromagnetic wave to the electric power of the radiated electromagnetic wave is important.

In view of a transmission characteristic of a terrestrial electromagnetic wave and an antenna efficiency, the frequency of the electromagnetic used in an outside wireless communication is exemplarily in a range of hundreds of MHz to tens of GHz (more specifically, about 300 MHz to 3 GHz, or up to 6 GHz if using the apparatus indoors). In frequencies less than 300 MHz, it is impossible to achieve an efficient antenna with a realistic apparatus size (tens of cm or below), and in frequency more than tens of GHz, a degradation of an energy transmission efficiency cannot be disregarded since a transmission loss of the electromagnetic wave is increased due to dust or moisture.

Further, since an analog circuit of a frequency band less than tens of MHz is achieved easily for a characteristic of a current semiconductor element, and since a manufacturing cost of the semiconductor element is low, a main operating frequency of the modulator or the modulator which is a main circuit element of the wireless apparatus, is exemplarily less than tens of MHz.

As discussed above, the frequency of the electromagnetic wave of this exemplary embodiment is decided above. Additionally, in this exemplary embodiment, since an electric power of the electric power supplying carrier is larger than that of the signal transmitting carrier, by making the frequency of the electric power supplying carrier lower than that of the signal transmitting carrier, an electric power efficiency of a transmitting circuit of the base station 1 can be improved.

Moreover, advantages of the constitution and operation of the child station above, is discussed below.

Due to a space transmission characteristic of the electromagnetic wave, the electric power of the electromagnetic wave for providing the electric power, which has a frequency from hundreds of MHz to tens of GHz, must be much larger than that provided externally by the electromagnetic wave. Therefore, the most efficient method for transforming the electric power provided externally by the electromagnetic wave to the electric power of the electromagnetic wave for radiating exteriorly, is to use the electromagnetic wave used for transmitting the electric power directly without going through electric power transformation or a frequency transformation.

However, since some kind of power sources are needed for incorporating an amplification function to the semiconductor element, a partial energy of the electromagnetic wave for transmitting the electric power and most energy of the electromagnetic wave for transmitting the signal are needed to be transformed to a direct current by rectifying and smoothing.

An exemplary feature is that both the frequency transforming for obtaining the signal which has a frequency less than tens of MHz and the rectifying for obtaining the direct current, can be achieved by a semiconductor nonlinear element. An element consuming the most electric power in an electric circuit or an electronic circuit, is the semiconductor element. In other words, the electric power efficiency of the apparatus which transmits or receives the electromagnetic wave can be improved by decreasing the number of semiconductor elements. Specifically, one semiconductor element is a circuit performing both the frequency transforming and the rectifying.

Further, in this case, although the electric power supplying electromagnetic wave, which has a large amount of the electric power and transmits from the base station 1 to the child station 10, and the electromagnetic wave which transmits from the child station 10 to the base station 1 and has a same frequency as the electric power supplying electromagnetic wave, and a small amount of the electric power are mixed at the same time, the transmission of the electromagnetic wave in various directions can be achieved by making these two electromagnetic waves be circularly-polarized waves which have the polarization characteristic rotating in an opposite direction to each other, while suppressing an interference of each other.

(An Advantage of the Exemplary Embodiment 1)

According to this exemplary embodiment, since the wireless communication between the base station 1 and the child station 10 can be achieved while the electric power is provided from the base station 1 to the child station 10 by the electric power supplying carrier, an exchange of information between the base station 1 and the child station 10 can be achieved remotely and without contact, without a replaceable power source (e.g., battery) being incorporated in the child station 10. Thus, when the child station 10 is located in an environment where a human cannot access directly (or safely or easily), an information concerning to the environment can be monitored and investigated wirelessly.

Exemplary Embodiment 2

(A Constitution of a Child Station)

Figure 2:
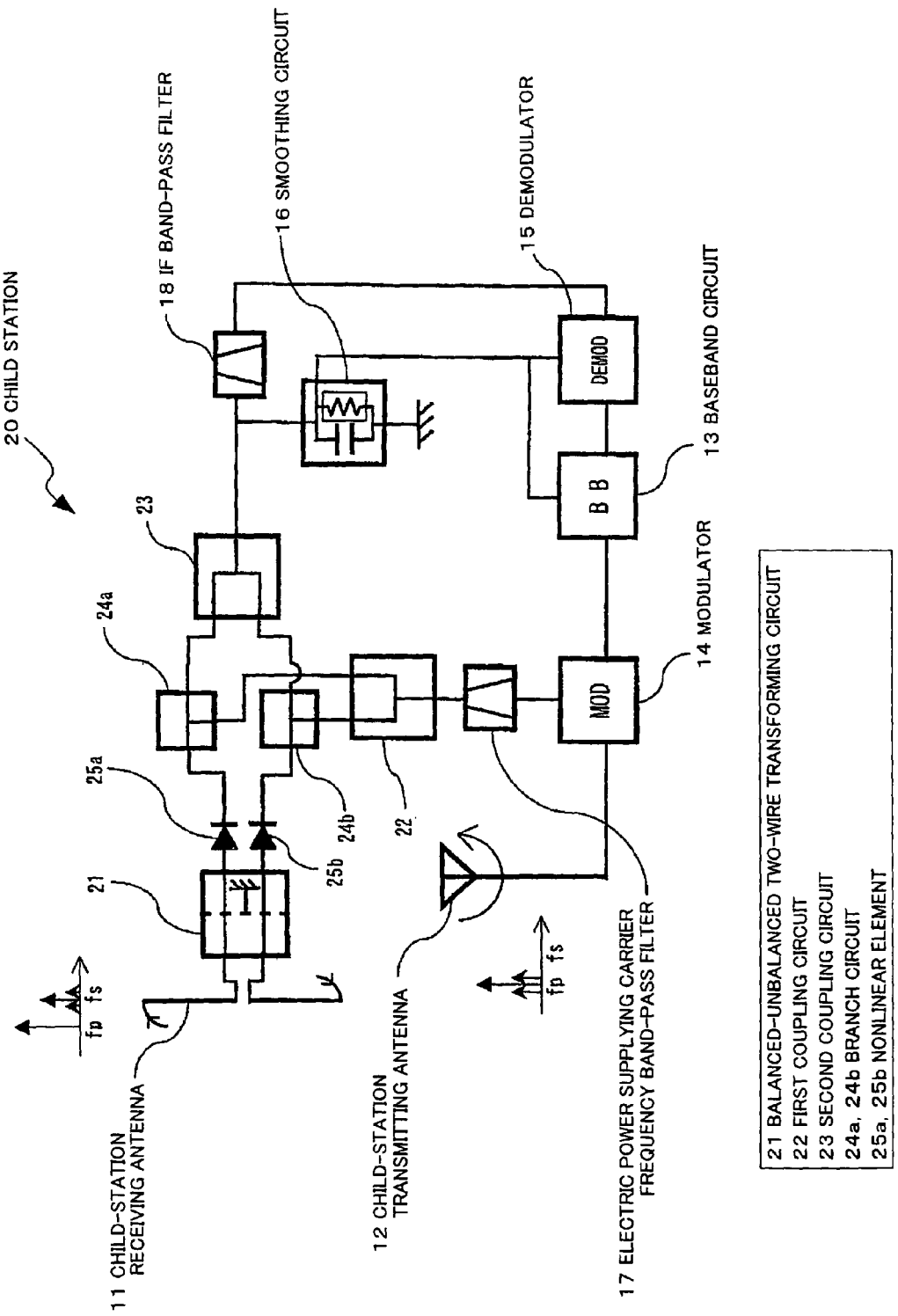
FIG. 2 is a schematic diagram showing a child station of a wireless monitoring system in a second exemplary embodiment according to the present invention.

FIG. 2 is a schematic diagram showing a child station of a wireless monitoring system in a second exemplary embodiment according to the present invention. All except a constitution and an operation of a child station explained below are the same as the wireless monitoring system of a first exemplary embodiment of FIG. 1.

A child station 20 according to this exemplary embodiment includes the child-station receiving antenna 11 which is a balanced, circularly-polarized antenna, the child-station transmitting antenna 12 which is a circularly-polarized antenna having a polarization characteristic rotating in a direction opposite to the child-station receiving antenna 11, the baseband circuit (BB) 13, the modulator (MOD) 14, the demodulator (DEMOD) 15, the smoothing circuit 16, the electric power supplying carrier frequency band-pass filter 17, the intermediate-frequency band-pass filter 18, a balanced-unbalanced two-wire transforming circuit 21, a first coupling circuit 22, a second coupling circuit 23, a branch circuit 24a, 24b, and a nonlinear element 25a, 25b.

(A Movement of the Child Station)

A balanced receiving electric power of the child-station receiving antenna 11 is inputted to the balanced-unbalanced two-wire transforming circuit 21 and divided to a two-wired balanced line. Each high-frequency electric power divided thereby is divided in two by the branch circuit 24a, 24b after going through the nonlinear element 25a, 25b.

Each output of each branch circuit 24a, 24b is inputted to the second coupling circuit 23, and an output thereof is inputted to the smoothing circuit 16 and the intermediate-frequency band-pass filter 18. Another output of each branch circuit 24a, 24b is inputted to the first coupling circuit 22, and an output thereof is inputted to the electric power supplying carrier frequency band-pass filter 17. A direct current output of the smoothing circuit 16 is provided to the baseband circuit 13 and the demodulator 15 as a power source, respectively.

An output of the intermediate-frequency band-pass filter 18 is inputted to the demodulator 15 and transformed to a baseband signal, and then inputted to the baseband circuit 13. After a signal processing in the baseband circuit 13, the baseband signal is inputted to the modulator 14. In the modulator 14, the electric power supplying carrier which is an output of the electric power supplying carrier frequency band-pass filter 17 is modulated. An output of the modulator 14 is radiated as an electric wave toward the base station 1 by the child-station transmitting antenna 12.

(An Advantage of the Exemplary Embodiment 2)

According to this exemplary embodiment, there are advantages in addition to the advantage of the first exemplary embodiment according to the present invention.

That is, the electric power of the electric power supplying carrier and the signal transmitting carrier which are transmitted from the base station 1 and are a different frequency, respectively, can be divided for an electric power extrication and for a signal extraction. Thus, a design freedom of the wireless monitoring system can be improved.

Exemplary Embodiment 3

A Constitution of a Child Station

Figure 3:
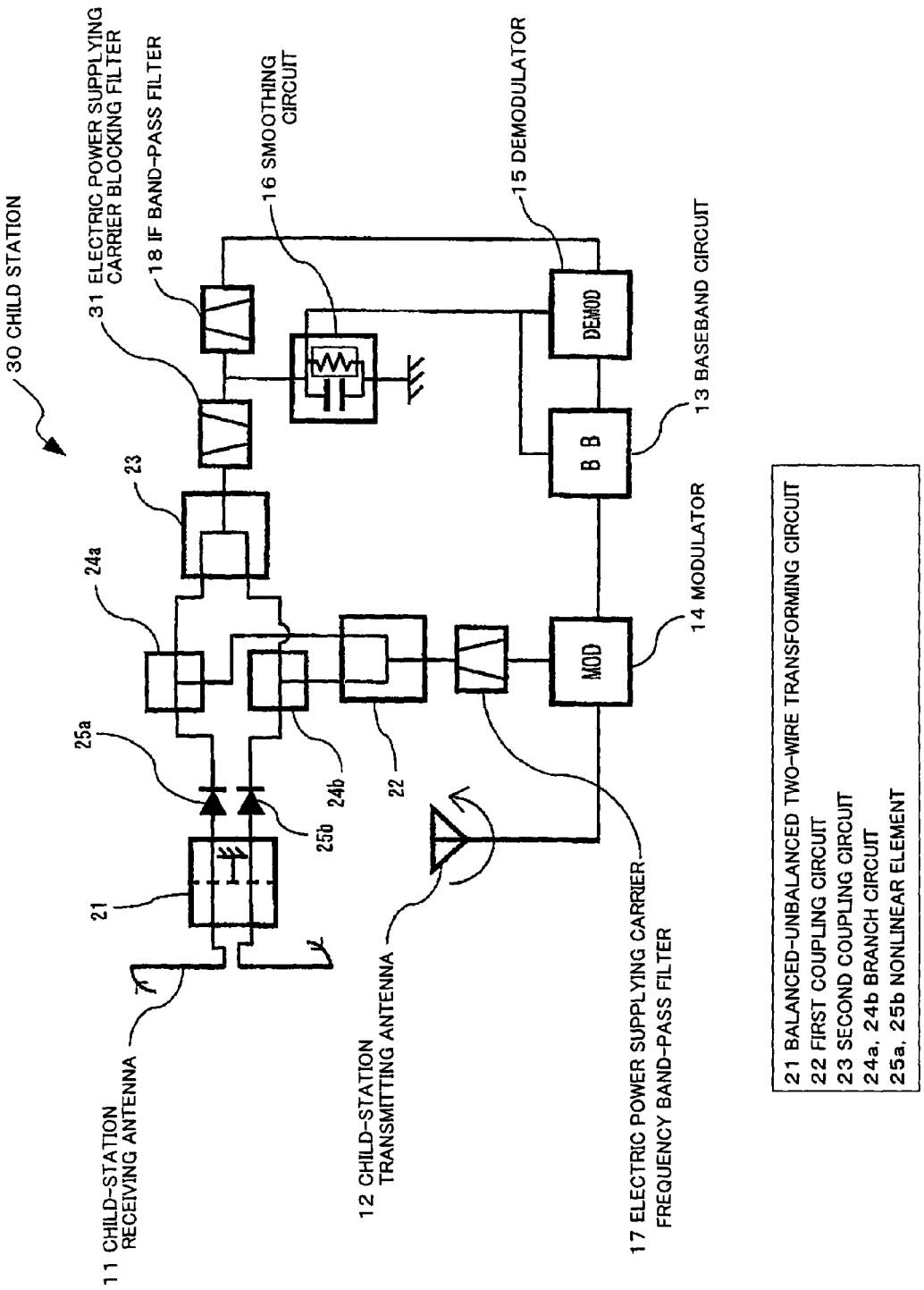
FIG. 3 is a schematic diagram showing a child station of a wireless monitoring system in a third exemplary embodiment according to the present invention.

FIG. 3 is a schematic diagram showing a child station of a wireless monitoring system in a third exemplary embodiment according to the present invention. An explanation of common features with exemplary embodiments explained above is omitted.

A constitution of a child station 30 of this exemplary embodiment, which is different from the second exemplary embodiment of FIG. 2, is that an electric power supplying carrier blocking filter 31 is inserted between the intermediate-frequency band-pass filter 18 and the second coupling circuit 23.

The electric power supplying carrier blocking filter 31 is placed before the intermediate-frequency band-pass filter 18 which is placed for blocking a high-frequency signal (electric power supplying carrier and signal transmitting carrier) to the demodulator 15 so that components of the signal transmitting carrier to be transmitted only to the smoothing circuit 16. Further, such a placement of the filter 31 allows a part of an energy of the electric power supplying carrier can be transmitted to the smoothing circuit 16 and the rest of the energy can be transmitted to the modulator 14.

(An Advantage of the Exemplary Embodiment 3)

According to this exemplary embodiment, compared to the second exemplary embodiment, a leakage of a carrier to a signal circuit system can be prevented, and an efficiency of the electric power transmitted from the child station 30 can be increased.

Exemplary Embodiment 4

(A Constitution of a Child Station)

Figure 4:
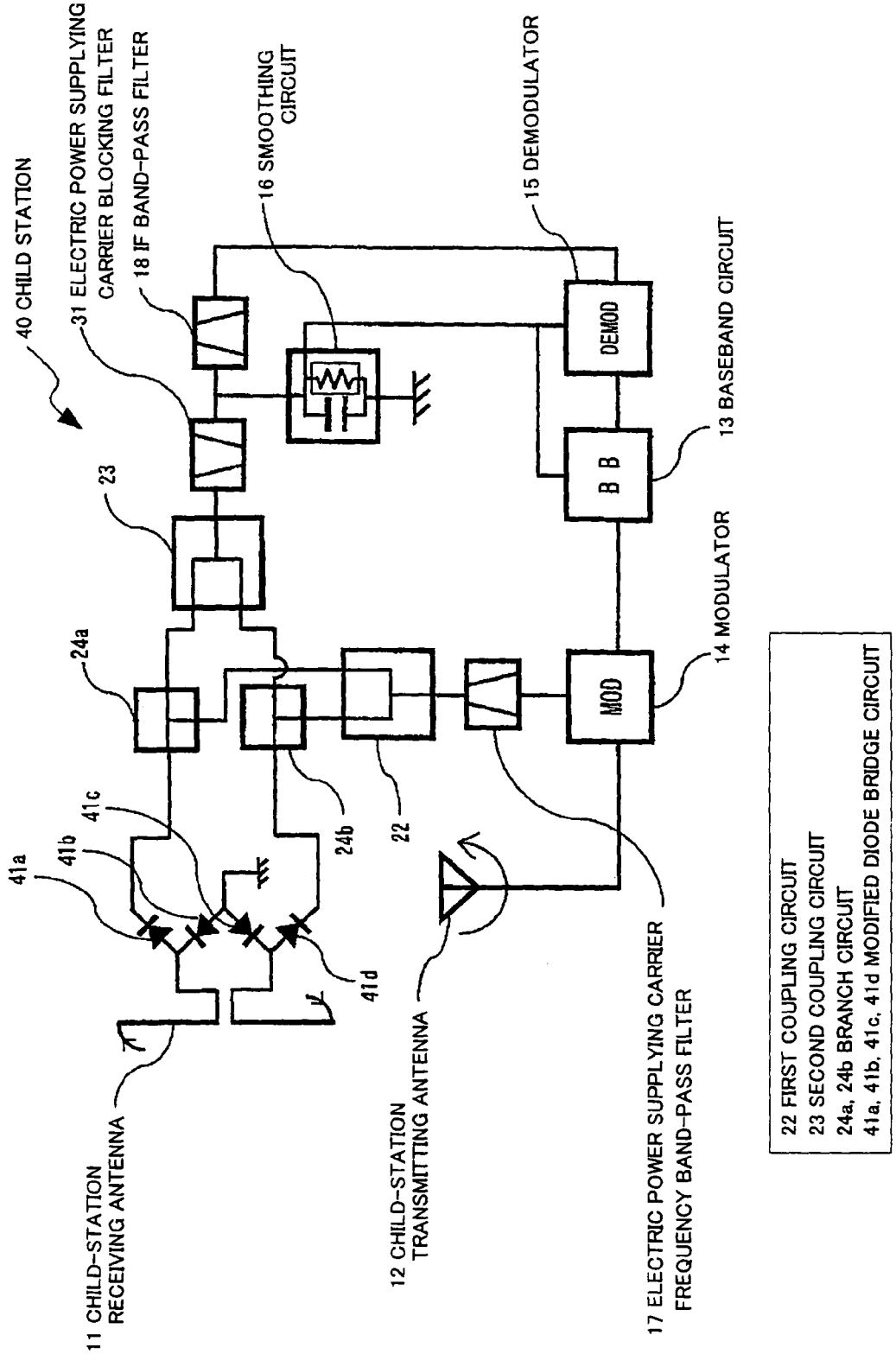
FIG. 4 is a schematic diagram showing a child station of a wireless monitoring system in a fourth exemplary embodiment according to the present invention.

FIG. 4 is a schematic diagram showing a child station of a wireless monitoring system in a fourth exemplary embodiment according to the present invention. An explanation of common features with exemplary embodiments explained above is omitted.

A constitution of a child station 40 of this exemplary embodiment, which is different from the third exemplary embodiment of FIG. 3, is that a modified diode bridge circuit 41a, 41b, 41c, 41d is used instead of the balanced-unbalanced two-wire transforming circuit 21 and the nonlinear element 25a, 25b.

(An Advantage of the Exemplary Embodiment 4)

According to this exemplary embodiment, compared to the third exemplary embodiment, since the balanced-unbalanced two-wire transforming circuit 21 can be formed by two diodes, a circuit of the child station 40 can be simplified and a manufacturing cost of the child station 40 can be decreased.

Exemplary Embodiment 5

A Constitution of a Child Station

Figure 5:
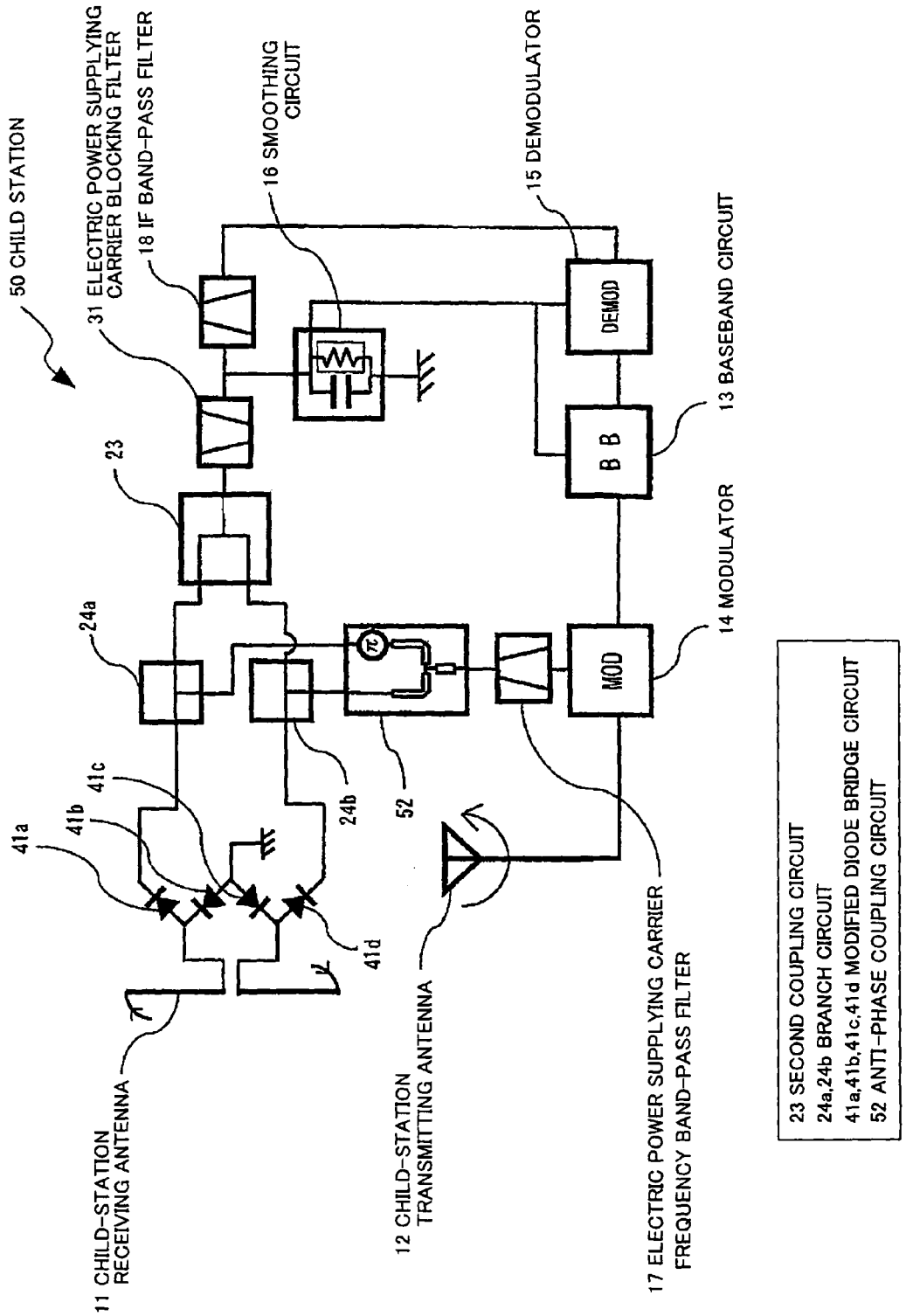
FIG. 5 is a schematic diagram showing a child station of a wireless monitoring system in a fifth exemplary embodiment according to the present invention.

FIG. 5 is a schematic diagram showing a child station of a wireless monitoring system in a fifth exemplary embodiment according to the present invention. An explanation of common features with exemplary embodiments explained above is omitted.

A constitution of a child station 50 of this exemplary embodiment, which is different from the fourth exemplary embodiment of FIG. 4, is that an anti-phase coupling circuit 52 is used instead of the first coupling circuit 22.

(An Advantage of the Exemplary Embodiment 5)

According to this exemplary embodiment, since an energy of the electric power supplying carrier which is transmitted from the base station and received by the child station can be used entirely in one period, an efficiency of the electric power transmitted from child station 50 can be increased.

Exemplary Embodiment 6

A Constitution of a Child Station

Figure 6:
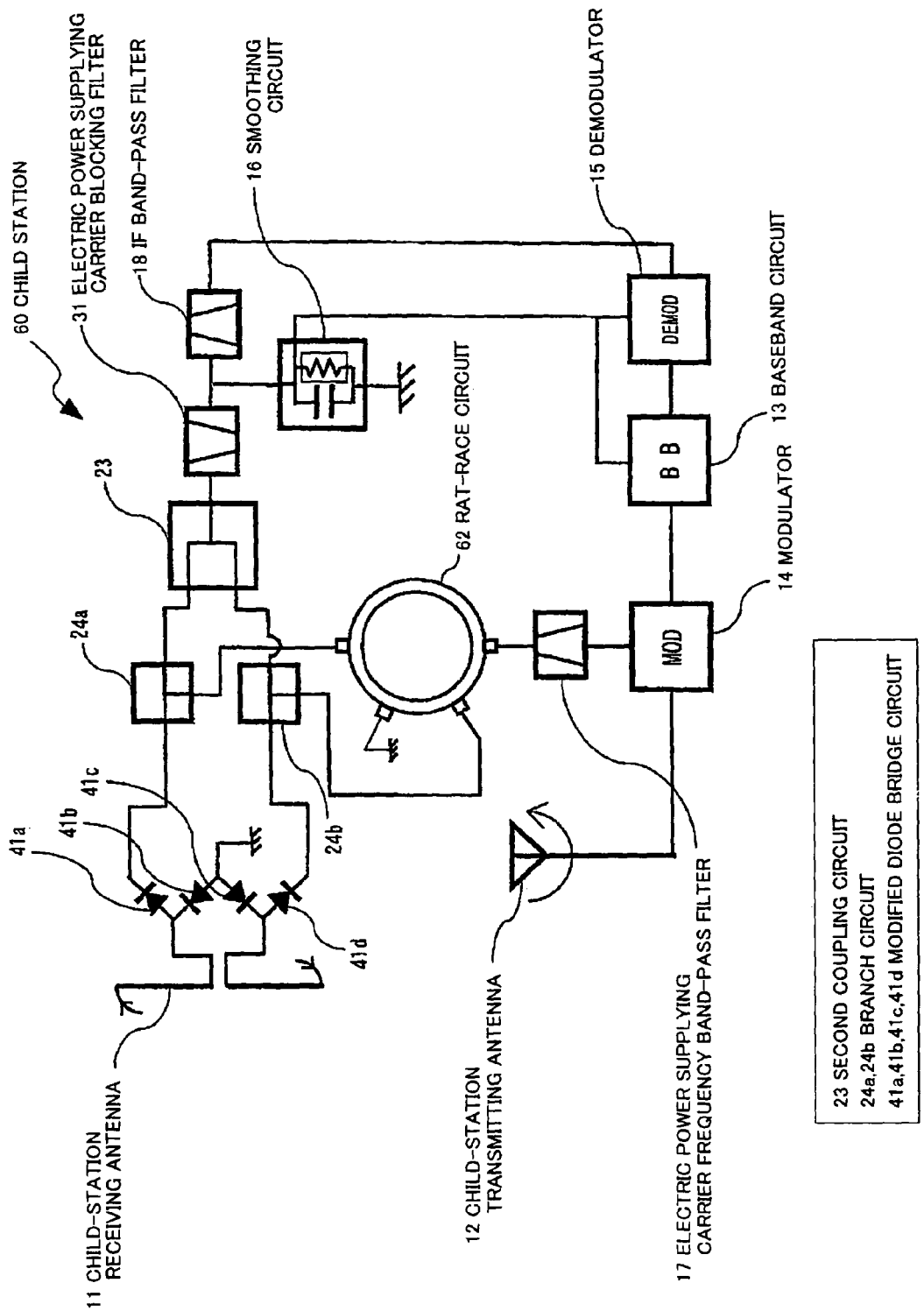
FIG. 6 is a schematic diagram showing a child station of a wireless monitoring system in a sixth exemplary embodiment according to the present invention.

FIG. 6 is a schematic diagram showing a child station of a wireless monitoring system in a sixth exemplary embodiment according to the present invention. An explanation of common features with exemplary embodiments explained above is omitted.

A constitution of a child station 60 of this exemplary embodiment, which is different from the fifth exemplary embodiment of FIG. 5, is that the anti-phase coupling circuit 52 is formed by a rat-race circuit 62.

(An Advantage of the Exemplary Embodiment 6)

According to this exemplary embodiment, since an isolation between input ports of the anti-phase coupling circuit 52 can be assured and a good condition of an impedance matching of the input ports can be maintained, a high-frequency energy of the electric power supplying carrier provided from the child station receiving antenna 11 can be provided to the modulator 14 efficiently, and an efficiency of the electric power transmitted from child station 60 can be increased.

Exemplary Embodiment 7

A Constitution of a Child Station

Figure 7:
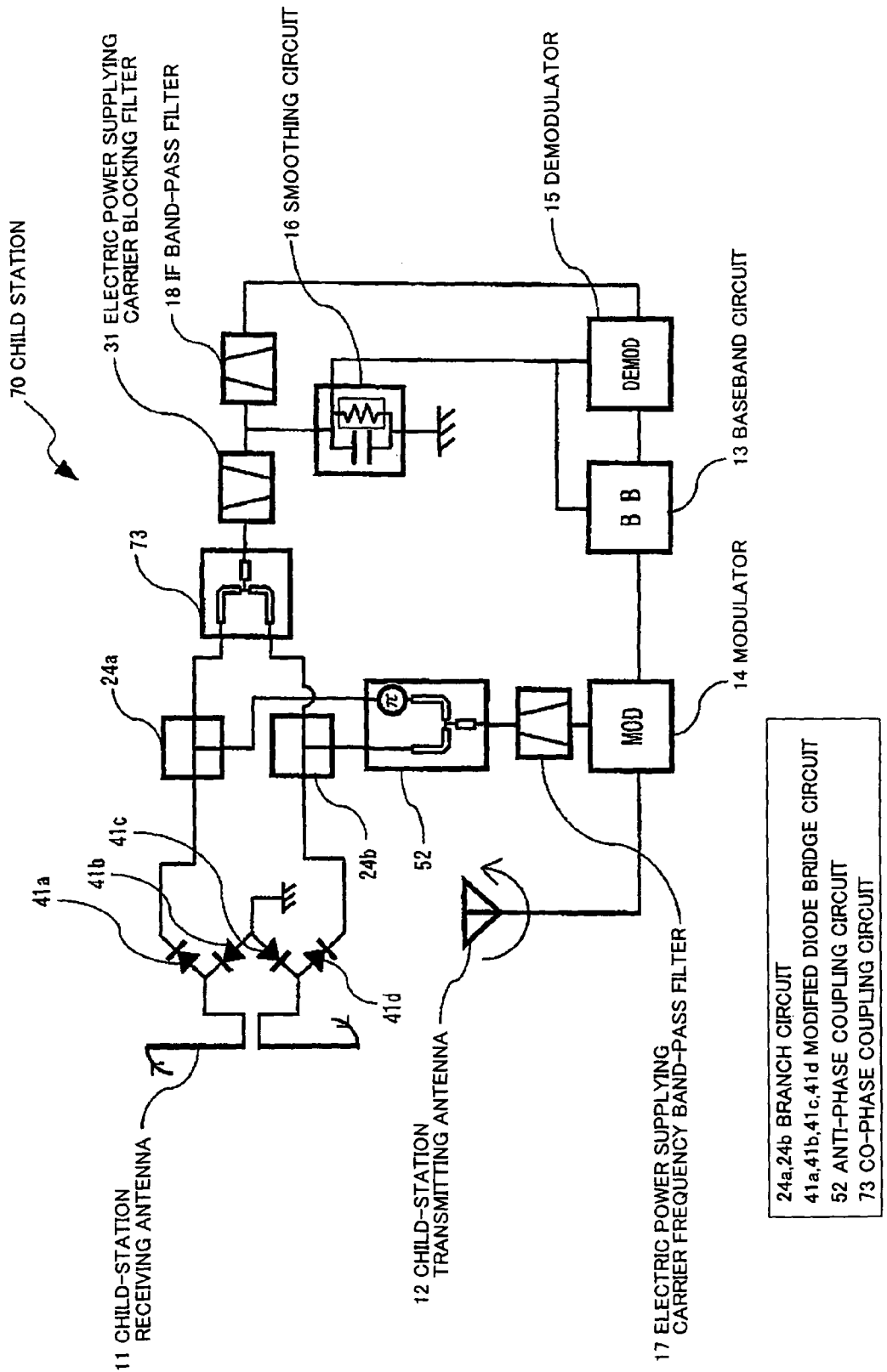
FIG. 7 is a schematic diagram showing a child station of a wireless monitoring system in a seventh exemplary embodiment according to the present invention.

FIG. 7 is a schematic diagram showing a child station of a wireless monitoring system in a seventh exemplary embodiment according to the present invention. An explanation of common features with exemplary embodiments explained above is omitted.

A constitution of a child station 70 of this exemplary embodiment, which is different from the fifth exemplary embodiment of FIG. 5, is that a co-phase coupling circuit 73 is used instead of the second coupling circuit 23.

(An Advantage of the Exemplary Embodiment 7)

According to this exemplary embodiment, since the electromagnetic wave having an intermediate frequency which is a differential frequency between the electric power supplying carrier and the signal transmitting carrier which are transmitted from the base station 1, can be provided to the demodulator 15, demodulating efficiency of the received modulating signal of child station 70 can be increased.

Exemplary Embodiment 8

A Constitution of a Child Station

Figure 8:
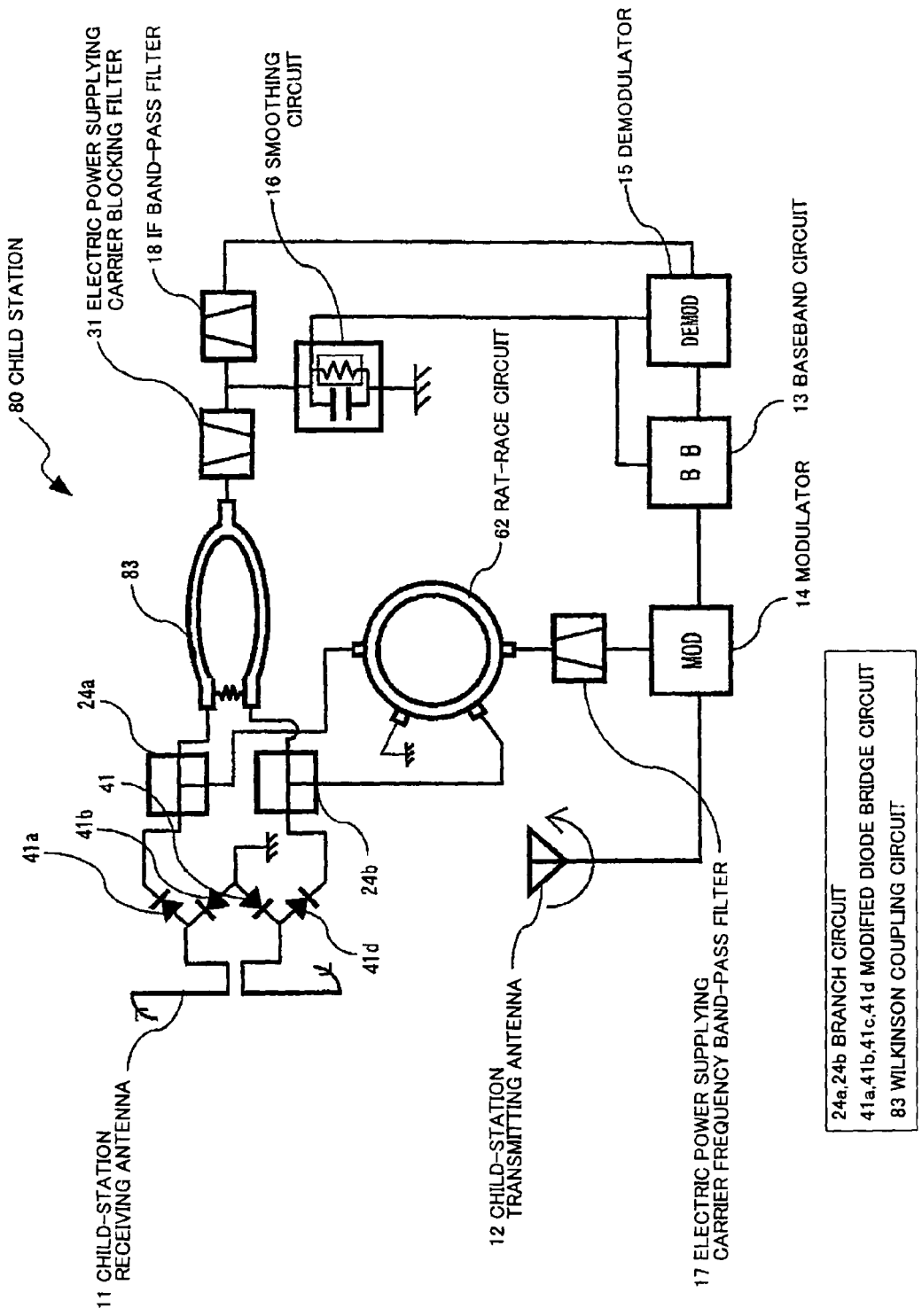
FIG. 8 is a schematic diagram showing a child station of a wireless monitoring system in an eighth exemplary embodiment according to the present invention.

FIG. 8 is a schematic diagram showing a child station of a wireless monitoring system in a eighth exemplary embodiment according to the present invention. An explanation of common features with exemplary embodiments explained above is omitted.

A constitution of a child station 80 of this exemplary embodiment, which is different from the sixth exemplary embodiment of FIG. 6, is that the second coupling circuit 23 (or co-phase coupling circuit 73 in the seventh exemplary embodiment) is formed by a Wilkinson coupling circuit 83.
(An Advantage of the Exemplary Embodiment 8)

According to this exemplary embodiment, since an isolation between input ports of the second coupling circuit 23 (or co-phase coupling circuit 73) can be assured, and a good condition of an impedance matching of the input ports can be maintained, an energy of a modulated signal of the signal transmitting carrier provided from the child station receiving antenna 11 can be provided to the demodulator 15 efficiently, and demodulating efficiency of the received modulating signal of child station 80 can be increased.

Exemplary Embodiment 9

A Constitution of a Child Station

Figure 9:
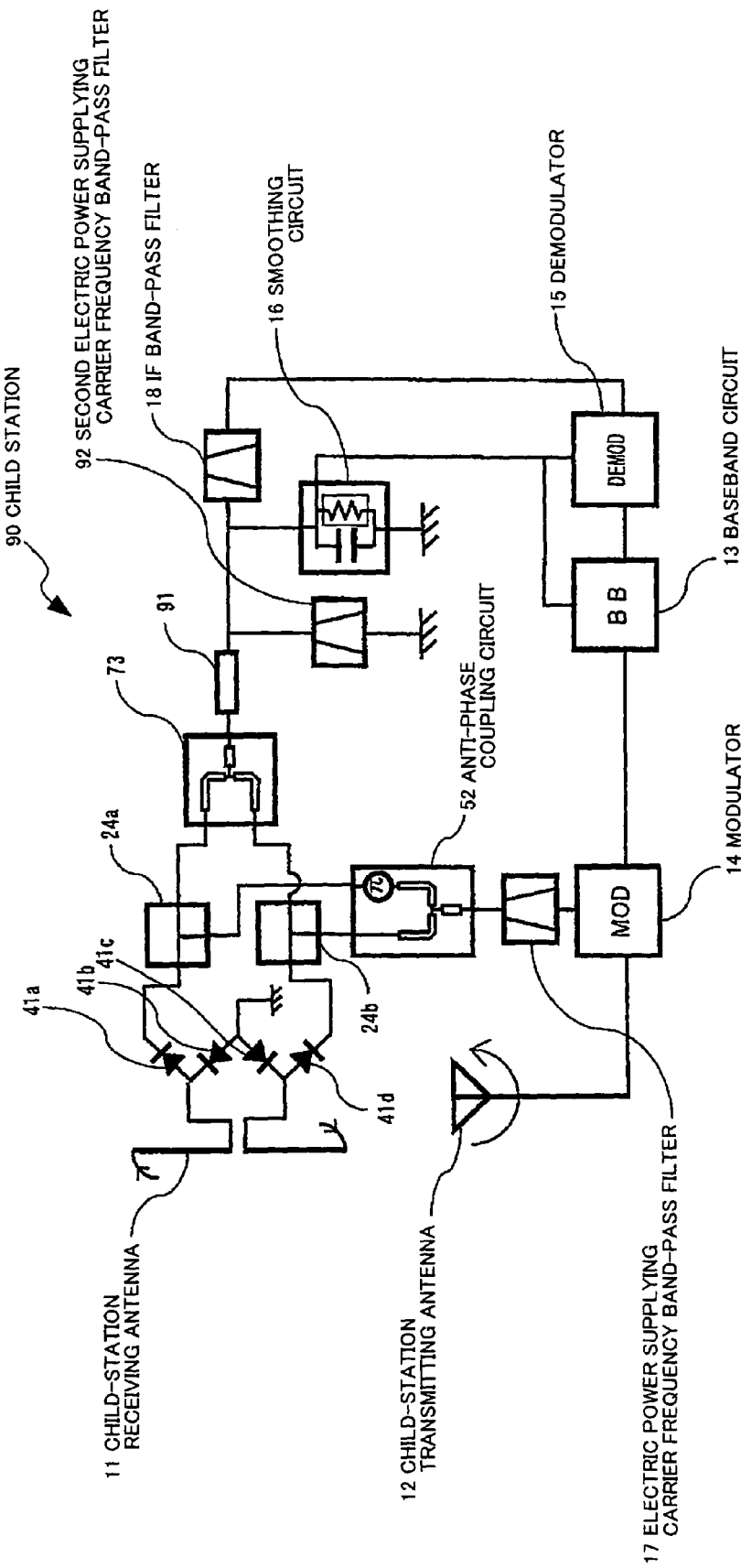
FIG. 9 is a schematic diagram showing a child station of a wireless monitoring system in a ninth exemplary embodiment according to the present invention.

FIG. 9 is a schematic diagram showing a child station of a wireless monitoring system in a ninth exemplary embodiment according to the present invention. An explanation of common features with exemplary embodiments explained above is omitted.

A constitution of a child station 90 of this exemplary embodiment, which is different from the seventh exemplary embodiment of FIG. 7, includes a transmission line 91 which has an electric length corresponding to quarter wavelength of a frequency of the electric power supplying carrier is inserted between the co-phase coupling circuit 73 and the intermediate-frequency band-pass filter 18 instead of the electric power supplying carrier blocking filter 31.

Further a second electric power supplying carrier frequency band-pass filter 92 which makes an intermediate-frequency band-pass filter 18 side of the transmission line 91 ground potential, is inserted.
(An Advantage of the Exemplary Embodiment 9)

According to this exemplary embodiment, an impedance ratio of the smoothing circuit 16 and a high-frequency circuit portion which is located in the child station receiving antenna 11 side which includes the co-phase coupling circuit 73 and anti-phase coupling circuit 52 can be adjusted by a characteristic impedance and the electric wavelength of the transmission line 91. Thus, a design freedom of distributing the electric power of the electric power supplying carrier and the signal transmitting carrier which are transmitted from the base station 1 and are the electromagnetic wave having a different frequency respectively (i.e., for an electric power extrication and for a signal extraction), can be increased.

Additionally, since the electric power supplying carrier blocking filter 31 is formed by the transmission line 91 which has an electric length corresponding to the quarter wavelength of a frequency of the electric power supplying carrier and the second electric power supplying carrier frequency band-pass filter 92, the electric power supplying carrier blocking filter 31 can be formed to have fewer components and a high performance thereof can be achieved.

Exemplary Embodiment 10

A Constitution of a Child Station

Figure 10:
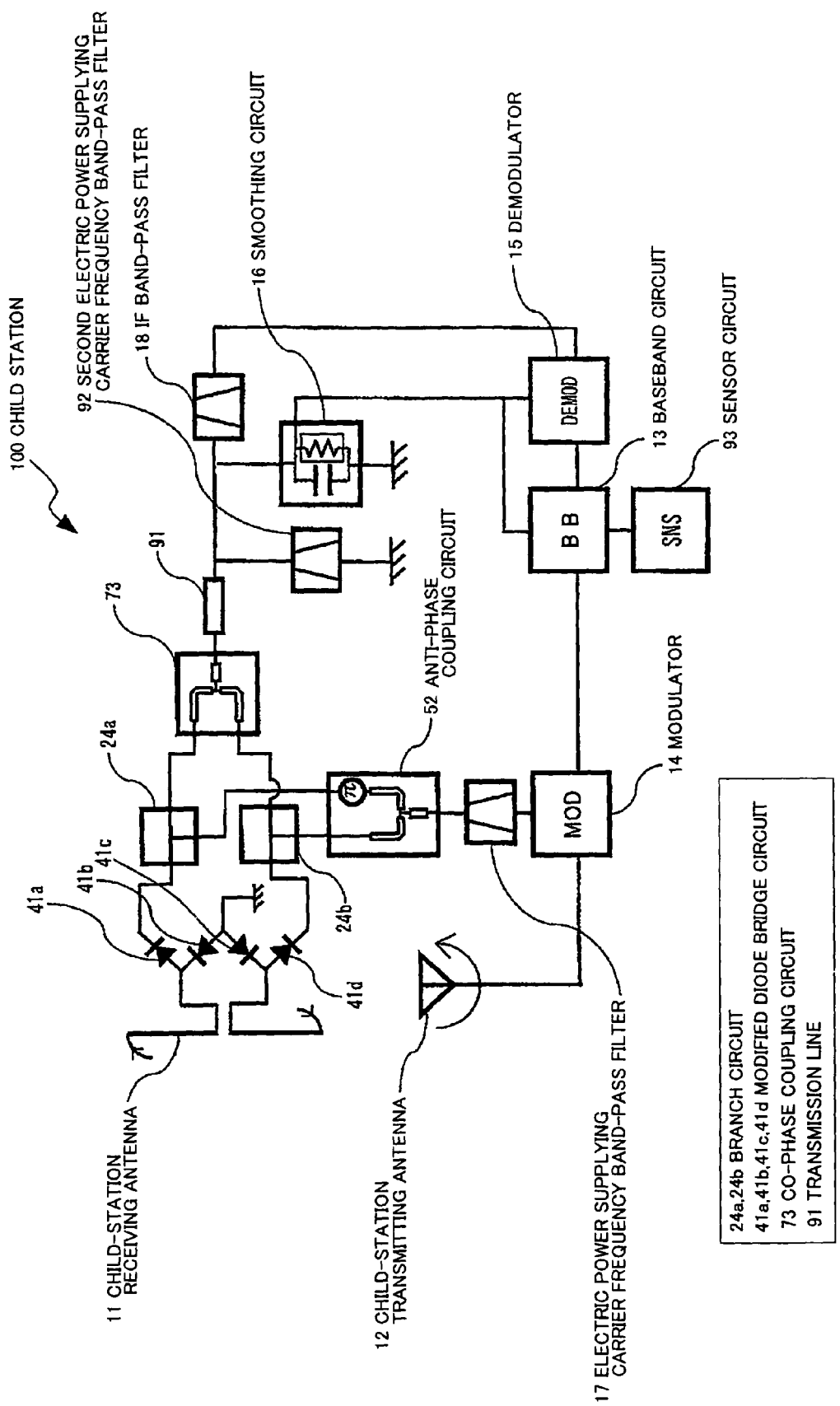
FIG. 10 is a schematic diagram showing a child station of a wireless monitoring system in a tenth exemplary embodiment according to the present invention.

FIG. 10 is a schematic diagram showing a child station of a wireless monitoring system in a tenth exemplary embodiment according to the present invention. An explanation of common features with exemplary embodiments explained above is omitted.

A constitution of a child station 100 of this exemplary embodiment, which is different from the ninth exemplary embodiment of FIG. 9, includes a sensor circuit (SNS) 93 connected to the baseband circuit 13 and provided with a direct current by the smoothing circuit 16.

Examples of the sensor circuit 93 may include a sensor responding to any of a temperature, a pressure, a concentration of a chemical substance, an electricity, a sound, an electromagnetic wave, a humidity, and a radioactivity. A baseband signal transmitted from the baseband circuit 13 is modified by using an output signal of the sensor.
(An Advantage of the Exemplary Embodiment 10)

According to this exemplary embodiment, since an information concerning an environment around where the child station 100 is located can be collected and transmitted to the base station 1 wirelessly, a wireless monitoring about an environment which can be accessed by a user (e.g., a human) can be achieved. Additionally, a size of the child station 100 can be downsized by combining and incorporating the sensor.

Exemplary Embodiment 11

A Constitution of a Child Station

Figure 11:
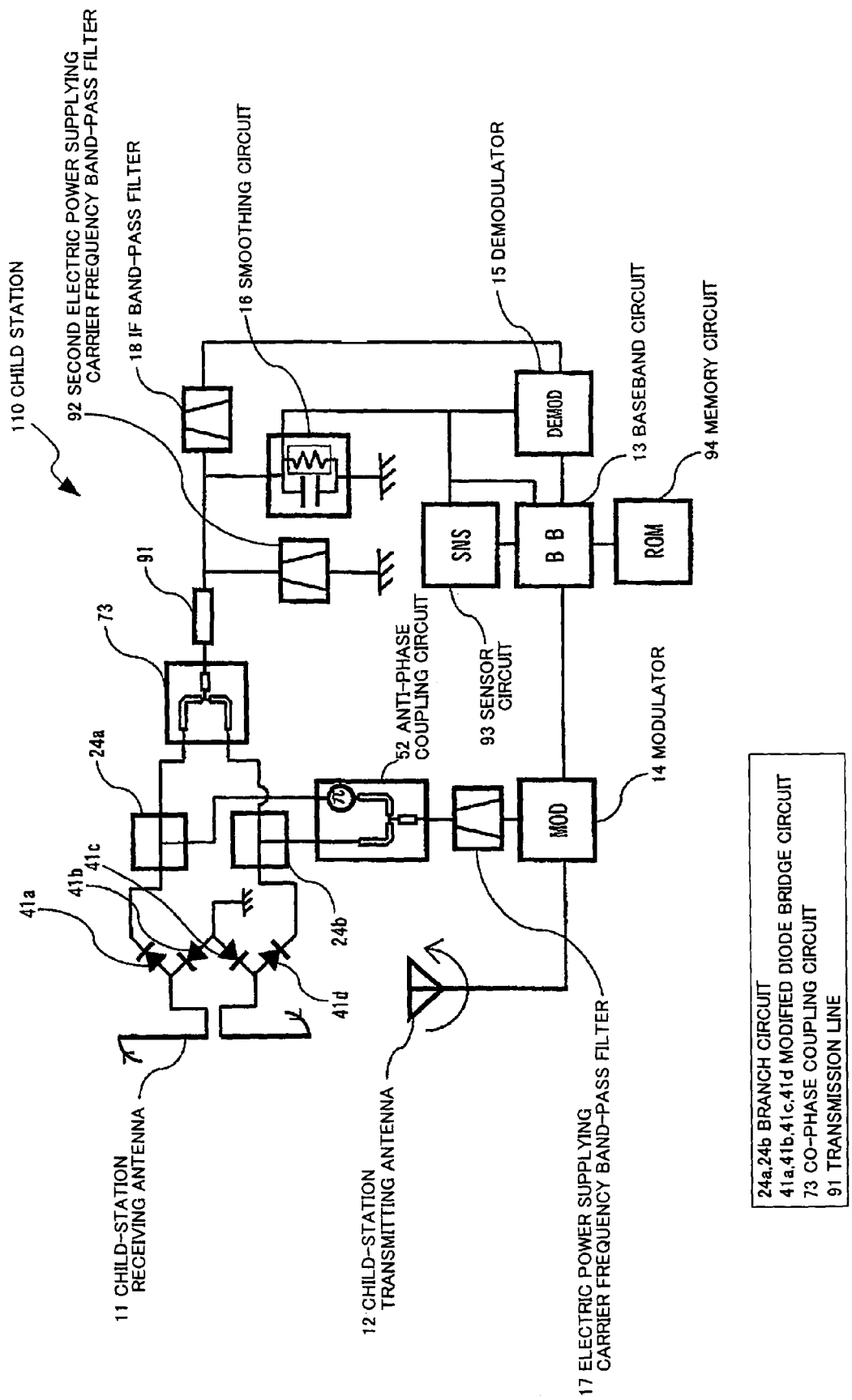
FIG. 11 is a schematic diagram showing a child station of a wireless monitoring system in an eleventh exemplary embodiment according to the present invention.

FIG. 11 is a schematic diagram showing a child station of a wireless monitoring system in a eleventh exemplary embodiment according to the present invention. An explanation of common features with exemplary embodiments explained above is omitted.

A constitution of a child station 110 of this exemplary embodiment, which is different from the tenth exemplary embodiment of FIG. 10, is that a memory circuit (ROM) 94 is connected to the baseband circuit 13.

(An Advantage of the Exemplary Embodiment 11)

According to this exemplary embodiment, when an information concerning an environment around a place where the child station 110 is located is collected and transmitted to the base station 1 wirelessly, a specific identification information of the child station 110, which is pre-stored in the memory circuit, can be transmitted at the same-time. Therefore, even when multiple child stations 110 are located in proximity to each other, the base station 1 can identify which child station 110 sends the information, and an identifying function of the child station 110 can be provided at much lower cost.

Exemplary Embodiment 12

A Constitution of a Child Station

Figure 12:
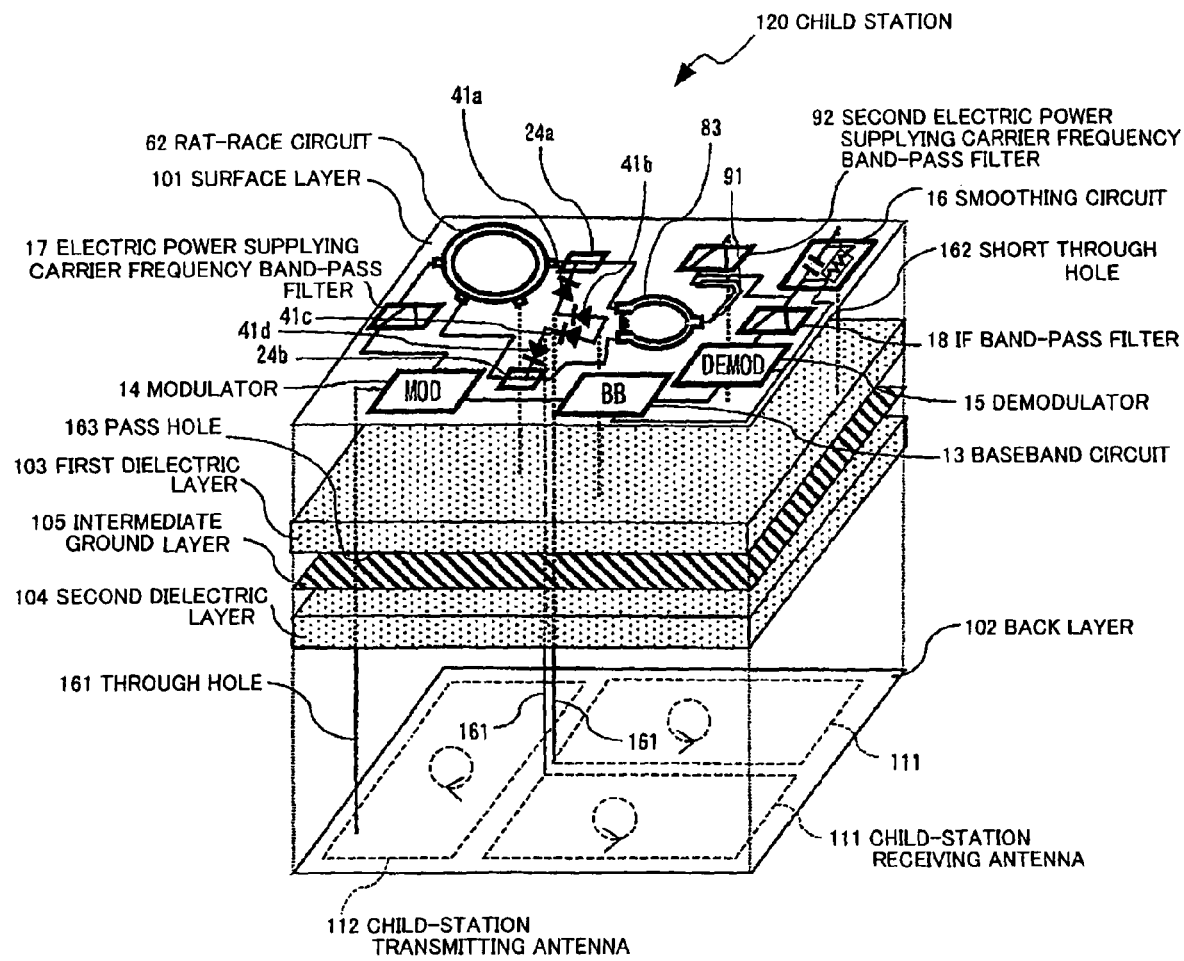
FIG. 12 is a schematic diagram showing a child station of a wireless monitoring system in a twelfth exemplary embodiment according to the present invention.

FIG. 12 is a schematic diagram showing a child station of a wireless monitoring system in a twelfth exemplary embodiment according to the present invention. An explanation of common features with exemplary embodiments explained above is omitted.

A child station 120 of this exemplary embodiment includes a multilayer substrate which is a trilayer structure including a surface layer 101, an intermediate ground layer 105, and a back layer 102. A first dielectric layer 103 is formed between the surface layer 101 and the intermediate ground layer 105, and a second dielectric layer 104 is formed between the back layer 102 and intermediate ground layer 105.

On the back layer 102, a child-station receiving antenna 111, which is a balanced circularly-polarized antenna, and a child-station transmitting antenna 112, which is a circularly-polarized antenna having a polarization characteristic rotating in a direction opposite to the child-station receiving antenna 111, are formed.

On the surface layer 101, the modified diode bridge circuit 41a, 41b, 41c, and 41d, the branch circuit 24a, 24b, the Wilkinson coupling circuit 83, the rat-race circuit 62, the transmission line 91, the second electric power supplying carrier frequency band-pass filter 92, the baseband circuit 13, the modulator 14, the demodulator 15, the smoothing circuit 16, the electric power supplying carrier frequency band-pass filter 17, the intermediate frequency band-pass filter 18 are formed.

(A Movement of the Child Station)

A balanced receiving electric power of the child-station receiving antenna 111 is inputted to the modified diode bridge circuit 41a, 41b, 41c, and 41d by using two through holes 161 while passing through a pass hole 163 without contact therewith. After the balanced receiving electric power is distributed to two balanced lines, each of two high-frequency electric powers is divided in two by the branch circuit 24a, 24b.

Each output of each branch circuit 24a, 24b is inputted to the Wilkinson coupling circuit 83, an output thereof is inputted to the smoothing circuit 16 and the intermediate-frequency band-pass filter 18 which are formed parallel to the second electric power supplying carrier frequency band-pass filter 92 which is connected to the intermediate ground layer 105 by a short through hole 162, via the transmission line 91.

Another output of each branch circuit 24a, 24b is inputted to the rat-race circuit 62, and an output thereof is inputted to the electric power supplying carrier frequency band-pass filter 17.

A direct current output of the smoothing circuit 16 is provided to the baseband circuit 13 and the demodulator 15 as a power source, respectively. An output of the intermediate-frequency band-pass filter 18 is inputted to the demodulator 15 and transformed to a baseband signal, and then inputted to the baseband circuit 13. After a signal processing in the baseband circuit 13, the baseband signal is inputted to the modulator 14. In the modulator 14, the electric power supplying carrier which is an output of the electric power supplying carrier frequency band-pass filter 17 is modulated. An output of the modulator 14 is provided to the child-station transmitting antenna 112 by using two through holes 161 while passing through a pass hole 163 without contact therewith and then radiated as an electric wave toward the base station 1 by the child-station transmitting antenna 112.

(An Advantage of the Exemplary Embodiment 12)

According to this exemplary embodiment, since various high-frequency circuits and intermediate-frequency circuits can be shielded electrically by the intermediate ground layer with the child-station receiving antenna 111 and the child-station transmitting antenna 112 which are formed on the back layer 102, an operation of the various high-frequency circuits and intermediate-frequency circuits can be stabilized. Additionally, since a constitution including the rat-race circuit 62 and Wilkinson coupling circuit 83 (instead of the anti-phase coupling circuit 52 and the co-phase coupling circuit 73 in the ninth exemplary embodiment) can be incorporated in a thin plate structure by a general-purpose multi-layer substrate process, the advantage of the ninth exemplary embodiment can be achieved in low cost.

Exemplary Embodiment 13

A Constitution of a Child Station

Figure 13:
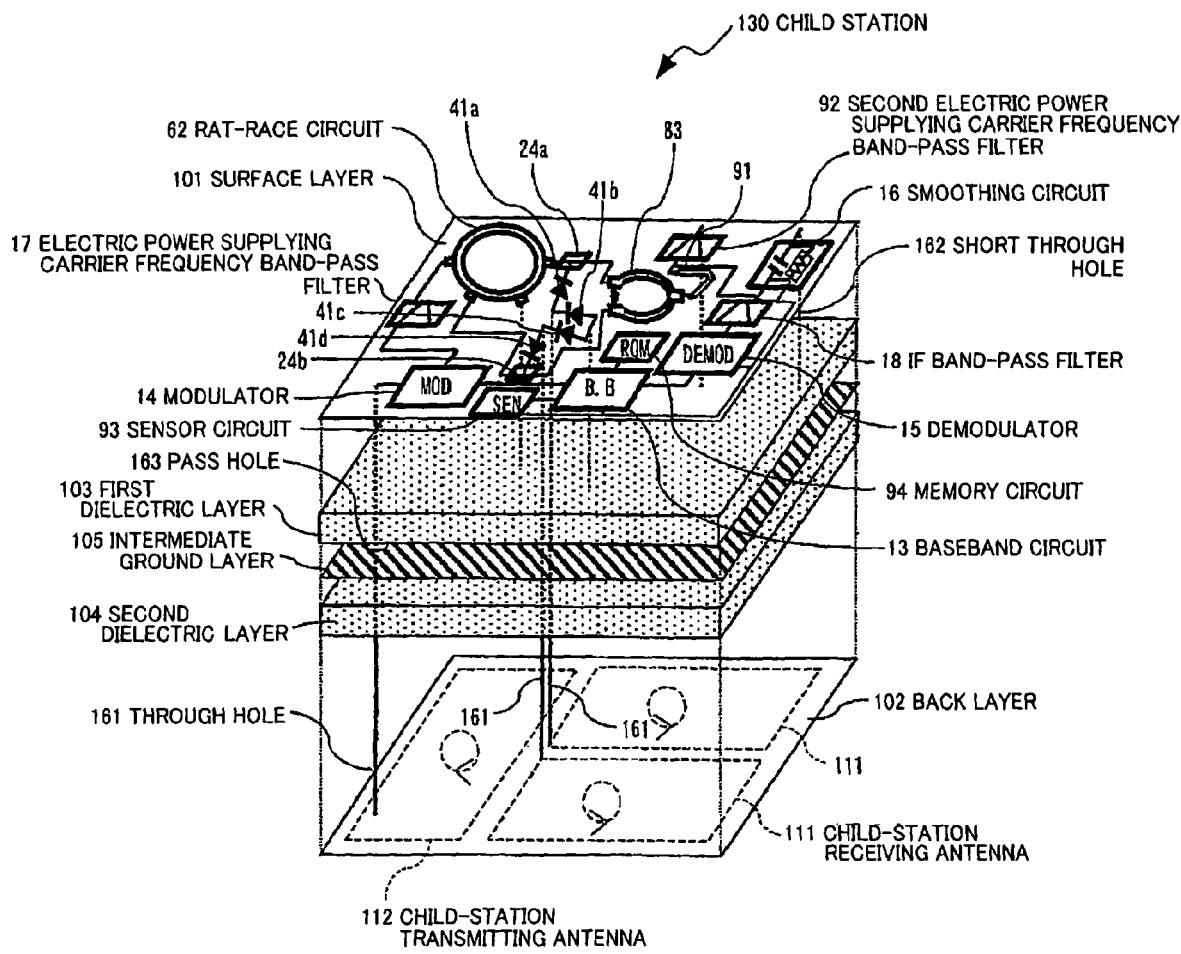
FIG. 13 is a schematic diagram showing a child station of a wireless monitoring system in a thirteenth exemplary embodiment according to the present invention.

FIG. 13 is a schematic diagram showing a child station of a wireless monitoring system in a thirteenth exemplary embodiment according to the present invention. An explanation of common features with exemplary embodiments explained above is omitted.

A constitution of a child station 130 of this exemplary embodiment, which is different from the twelfth exemplary embodiment of FIG. 12, is that the sensor circuit 93 is formed on the surface layer 101, connected to the baseband circuit 13 and provided with a direct current by the smoothing circuit 16, and that the memory circuit 94 is formed on the surface layer 101 and connected to the baseband 13.

(An Advantage of the Exemplary Embodiment 13)

According to this exemplary embodiment, since various high-frequency circuits and intermediate-frequency circuits can be shielded electrically by the intermediate ground layer with the child-station receiving antenna 111 and the child-station transmitting antenna 112 which are formed on the back layer 102, an operation of the various high-frequency circuits and intermediate-frequency circuits can be stabilized. Additionally, since a constitution including the rat-race circuit 62 and Wilkinson coupling circuit 83 instead of the anti-phase coupling circuit 52 and the co-phase coupling circuit 73 in the eleventh exemplary embodiment can be incorporated in a thin plate structure by a general-purpose multi-layer substrate process, the advantage of the eleventh exemplary embodiment can be achieved in low cost.

Although the invention has been described with respect to specific exemplary embodiments for complete and clear disclosure, the appended claims are not to be thus limited but are to be construed as embodying all modifications and alternative constructions that may occur to one skilled in the art which fairly fall within the basic teaching herein set forth.

For example, the child station discussed in the first to eleventh exemplary embodiments can be provided by a multilayer substrate such as the trilayer structure discussed in the twelfth and thirteenth exemplary embodiments.

Further, it is noted that Applicant's intent is to encompass equivalents of all claim elements, even if amended later during prosecution.

What is claimed is:

1. A wireless monitoring system using a base station and a child station, comprising:
    said base station including:
        a base-station transmitting antenna for transmitting an electric power supplying carrier and a signal transmitting carrier to said child station; and
        a base-station receiving antenna for receiving an output from said child station;
    said child station including:
        a child-station receiving antenna which comprises a balanced antenna;
        a nonlinear circuit that receives an output from said child-station receiving antenna;
        a smoothing circuit that receives an output from said nonlinear circuit;
        a first high-frequency band-pass filter, a pass band of said first high-frequency band-pass filter comprising a frequency of said electric power supplying carrier;
        an intermediate-frequency band-pass filter, a pass band of said intermediate-frequency band-pass filter comprising an intermediate frequency which comprises a differential frequency between said electric power supplying carrier and said signal transmitting carrier;
        a demodulator that receives an output from said intermediate-frequency band-pass filter and uses an output from said smoothing circuit as a power source;
        a baseband circuit that modifies a baseband signal using an output from said demodulator;
        a modulator for modulating a high frequency signal outputted from said first high-frequency band-pass filter by using said baseband signal; and
        a child-station transmitting antenna for radiating an output from said modulator,
    wherein said base-station transmitting antenna and said child-station receiving antenna comprise circularly-polarized antennas which have a same rotating direction, and said child-station transmitting antenna and said base-station receiving antenna comprise circularly-polarized antennas which have a polarization characteristic rotating in a direction opposite to said base-station transmitting antenna and said child-station receiving antenna.

2. The wireless monitoring system according to claim 1, wherein:
    said child-station receiving antenna comprises a balanced antenna;
    said nonlinear circuit includes a balanced-unbalanced transforming circuit for distributing a balanced input received by said child-station receiving antenna into two unbalanced outputs;
    two nonlinear elements receiving each of said two unbalanced outputs;
    first and second branch circuits for distributing each signal from said nonlinear elements;
    a first coupling circuit for coupling an output from each of said first and second branch circuits, an output of said first coupling circuit being inputted to said first high-frequency band-pass filter; and
    a second coupling circuit for coupling the other output from each of said first and second branch circuits, an output of said second coupling circuit being inputted to said smoothing circuit and said intermediate-frequency band-pass filter.

3. The wireless monitoring system according to claim 2, wherein:
    an output of said second coupling circuit is outputted through an electric power supplying carrier blocking filter.

4. The wireless monitoring system according to claim 2, wherein:
    diodes are disposed instead of said balanced-unbalanced transforming circuit and said nonlinear element;
    said diodes are disposed between each terminal of said child-station receiving antenna and a ground potential, in which a cathode of said diodes are connected to the ground potential; and
    said diodes are disposed between each terminal of said child-station receiving antenna and said first and second branch circuits, in which anodes of said diodes are connected to each of said first and second branch circuits.

5. The wireless monitoring system according to claim 2, wherein:
    said first coupling circuit comprises an anti-phase coupling circuit.

6. The wireless monitoring system according to claim 5, wherein:
    said anti-phase coupling circuit comprises a rat-race coupling circuit.

7. The wireless monitoring system according to claim 2, wherein:
    said second coupling circuit comprises a co-phase coupling circuit.

8. The wireless monitoring system according to claim 7, wherein:
    said co-phase coupling circuit comprises a Wilkinson coupling circuit.

9. The wireless monitoring system according to claim 2, further comprising:
    a transmission line, having an electric length corresponding to a quarter wavelength of a frequency of said electric power supplying carrier, being inserted instead of said electric power supplying carrier blocking filter; and
    a second high-frequency band-pass filter being inserted between one end of said transmission line and ground potential, a pass band of said second high-frequency band-pass filter being a frequency of said electric power supplying carrier.

10. The wireless monitoring system according to claim 2, wherein:
    an electric power of said electric power supplying carrier is larger than that of said signal transmitting carrier.

11. The wireless monitoring system according to claim 2, wherein:
    a frequency of said electric power supplying carrier is smaller than that of said signal transmitting carrier.

12. The wireless monitoring system according to claim 2, wherein:
    said child-station transmitting antenna comprises an unbalanced antenna.

13. The wireless monitoring system according to claim 2, wherein:
    a method of said modulator comprises a frequency modulation.

14. The wireless monitoring system according to claim 2, wherein:
    said signal transmitting carrier is modulated by frequency.

15. The wireless monitoring system according to claim 2, wherein:
a characteristic impedance of said child-station receiving antenna is larger than twice of a characteristic impedance of said smoothing circuit.

16. The wireless monitoring system according to claim 2, further comprising:
a sensor circuit connected to said baseband circuit, said sensor circuit responding to any of a temperature, a pressure, a concentration of a chemical substance, an electricity, a sound, an electromagnetic wave, a humidity, and a radioactivity; and
a baseband signal transmitted from said baseband circuit being modified by using an output signal of said sensor circuit.

17. The wireless monitoring system according to claim 16, further comprising:
a memory connected to said baseband circuit, said memory having a specific identification information of said child station,
wherein said specific identification is stored to said baseband signal by being superposed on a modulation signal of said signal transmitting carrier, and an identification is added to said baseband signal transmitted from said baseband circuit only when said specific identification inputted to said baseband circuit and said specific identification stored in said memory correspond.

18. The wireless monitoring system according to claim 17, wherein:
an addition of said information to said baseband signal transmitted from said baseband circuit is modified by using an output signal of said sensor circuit.

19. The wireless monitoring system according to claim 2, wherein:
said child-station transmitting antenna and said child-station receiving antenna comprise planar antennas.

20. The wireless monitoring system according to claim 2, wherein:
said child station includes a multilayer substrate; and
said child-station transmitting antenna and said child-station receiving antenna are formed on one layer of said multilayer substrate, and other circuit components are formed on another layer of said multilayer substrate.

21. A child station used in a wireless monitoring system using an electric power supplying carrier and a signal transmitting carrier, comprising:
a child-station receiving antenna which comprises a balanced antenna;
a nonlinear circuit which receives an output from said child-station receiving antenna;
a smoothing circuit which receives an output from said nonlinear circuit;
a first high-frequency band-pass filter, a pass band of said first high-frequency band-pass filter comprising a frequency of said electric power supplying carrier;
an intermediate-frequency band-pass filter, a pass band of said intermediate-frequency band-pass filter comprising an intermediate frequency which comprises a differential frequency between said electric power supplying carrier and said signal transmitting carrier;
a demodulator which receives an output from said intermediate-frequency band-pass filter and uses an output from said smoothing circuit as a power source;
a baseband circuit which modifies a baseband signal based on an output from said demodulator;
a modulator for modulating a high frequency signal outputted from said first high-frequency band-pass filter by using said baseband signal; and
a child-station transmitting antenna for radiating an output from said modulator,
wherein said child-station receiving antenna and said child-station transmitting antenna are circularly-polarized antennas which have a polarization characteristic rotating in an opposite direction from each other.

\* \* \* \* \*